(12) United States Patent
Zhu et al.

(10) Patent No.: US 6,236,738 B1
(45) Date of Patent: May 22, 2001

(54) SPATIOTEMPORAL FINITE ELEMENT METHOD FOR MOTION ANALYSIS WITH VELOCITY DATA

(75) Inventors: Yudong Zhu, Stanford; Norbert J. Pelc, Los Altos, both of CA (US)

(73) Assignee: Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/165,232

(22) Filed: Oct. 1, 1998

Related U.S. Application Data

(60) Provisional application No. 60/081,173, filed on Apr. 9, 1998.

(51) Int. Cl.[7] ............................ G06K 9/00
(52) U.S. Cl. ................................ 382/107
(58) Field of Search ........................ 382/100, 103, 382/107; 348/699

(56) References Cited

U.S. PATENT DOCUMENTS

| | | | |
|---|---|---|---|
| 5,109,425 | * 4/1992 | Lawton | 382/107 |
| 5,257,626 | * 11/1993 | Pelc et al. | 600/410 |
| 5,600,731 | * 2/1997 | Sezan et al. | 382/107 |
| 5,875,108 | * 2/1999 | Hoffberg et al. | 700/17 |
| 5,974,360 | * 10/1999 | Otsuka et al. | 702/3 |
| 5,983,251 | * 11/1999 | Martens et al. | 708/203 |
| 6,005,625 | * 12/1999 | Yokoyama | 348/416 |
| 6,031,374 | * 2/2000 | Epstein et al. | 324/306 |
| 6,047,088 | * 4/2000 | van Beek et al. | 382/243 |

* cited by examiner

*Primary Examiner*—Andrew W. Johns
*Assistant Examiner*—Shervin Nakhjavan
(74) *Attorney, Agent, or Firm*—Townsend and Townsend and Crew LLP; Henry K. Woodward

(57) ABSTRACT

Disclosed is a method for nonrigid cyclic motion analysis using a series of images covering the cycle, acquired, for example, from phase contrast magnetic resonance imaging. The method is based on fitting a global spatiotemporal finite element mesh model to motion data samples of an extended region at all time frames. A spatiotemporal model is composed of time-varying finite elements, with the nonrigid motion of each characterized by a set of Fourier harmonics. The model is suitable for accurately modeling the kinematics of a cyclically moving and deforming object with complex geometry, such as that of the myocardium. The model has controllable built-in smoothing in space and time for achieving satisfactory reproducibility in the presence of noise. Motion data measured, with PC MRI for example, can be used to quantify motion and deformation by fitting the model to data.

21 Claims, 8 Drawing Sheets

*FIG. 9A* *FIG. 9B*
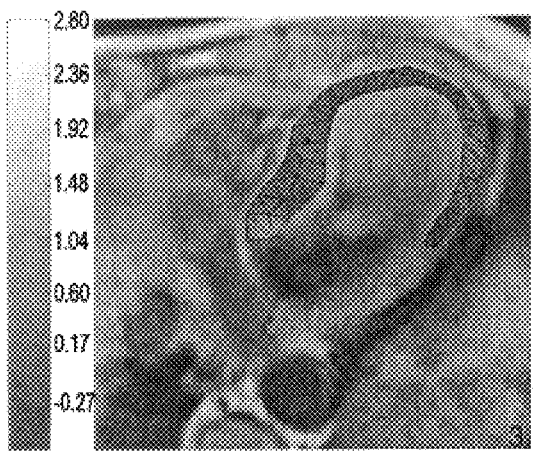 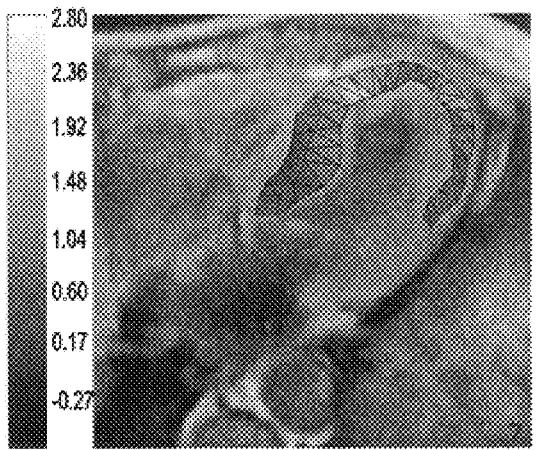
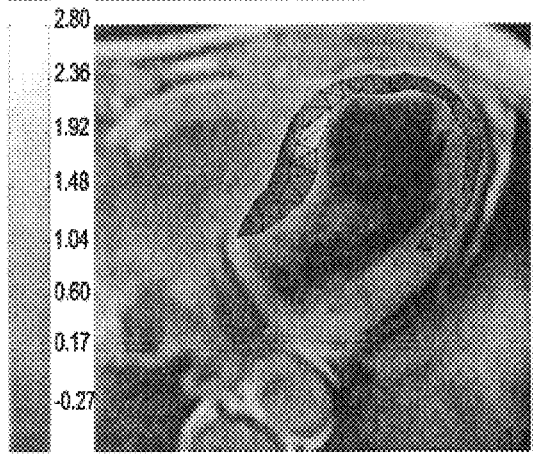 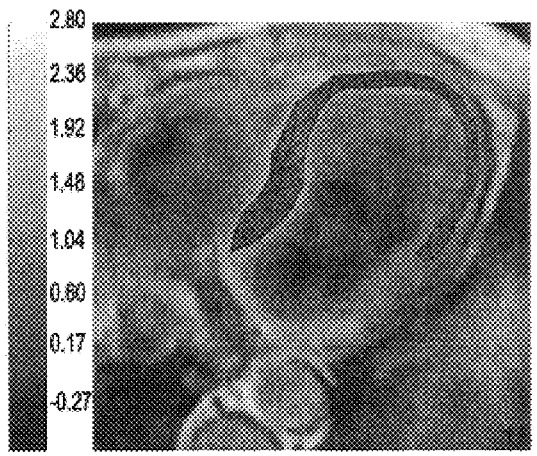
*FIG. 9C* *FIG. 9D*

SPATIOTEMPORAL FINITE ELEMENT METHOD FOR MOTION ANALYSIS WITH VELOCITY DATA

This application claims priority from provisional application Ser. No. 60/081,173 filed Apr. 9, 1998.

The U.S. government has rights in the disclosed invention pursuant to NIH Contract No. RO1 HL 46347-05 with Stanford University, assignee.

BACKGROUND OF THE INVENTION

This invention relates generally to magnetic resonance imaging, and more particularly the invention relates to motion analysis using motion data, for example as collected using Phase-Contrast (PC) cine Magnetic Resonance Imaging (MRI).

Methods for the calculation of the motion of a material point or a small region during a motion cycle (e.g. the cardiac cycle) are known. The simplest methods assume that the region being analyzed moves as a rigidly translating body. Deformation can be studied by tracking the motion, and specifically the relative motion, of multiple regions. However, the extraction of information may not be ideal since all the motion data samples within a region may not contribute to the results.

A method that allows for deformation and rotation of a region is also known. Typically, the method assumes that the strain within the region being analyzed is homogeneous. The spatial distribution of velocity within the region is assumed to be a linear function, and this allows for homogenous deformation and rotation. In principle, higher order spatial dependence could be allowed, thereby supporting non-homogeneous strain. However, one would then need to decide the degree of heterogeneity to be supported in a particular application. This depends on the object being studied as well as the size of the region.

SUMMARY OF THE INVENTION

In accordance with the present invention, a method of motion analysis of a moving region within an object comprises the steps of a) obtaining motion data from the moving region for a plurality of time frames, b) identifying a plurality of movable material points within the region, c) defining a spatiotemporal model of the region which relates the kinematics of the region during the plurality of time frames to the material points, and d) computing motion and deformation of the moving region using the motion data and said model. The identified material points can be node points of a dynamic mesh composed of a plurality of non-overlapping elements, including two dimensional elements such as triangles and three dimensional elements such as tetrahedrons.

In accordance with an embodiment, an object undergoing cyclic nonrigid motion such as the heart is modeled as a dynamic finite element mesh, and the motion and deformation (Kinematics) of the entire mesh as a function of time in the cycle is computed using a single spatiotemporal model. Because the object can be divided into many mesh elements, the kinematics within each element can be assumed to be relatively homogenous. Heterogeneity within the object is supported by the number and size of the elements comprising the mesh. Analyzing the object with the spatiotemporal mesh modeling assumes a structured view of the underlying object motion, which facilitates interpreting as well quantifying displacement and strain fields.

The invention and objects and features thereof will be more readily apparent from the following detailed description and appended claims when taken with the drawings.

BRIEF DESCRIPTION OF THE DRAWINGS

FIGS. 9(a)–(d) and 10 illustrate estimated principal strain distribution for two in vivo studies.

DETAILED DESCRIPTION OF ILLUSTRATIVE EMBODIMENTS

Figure 1:
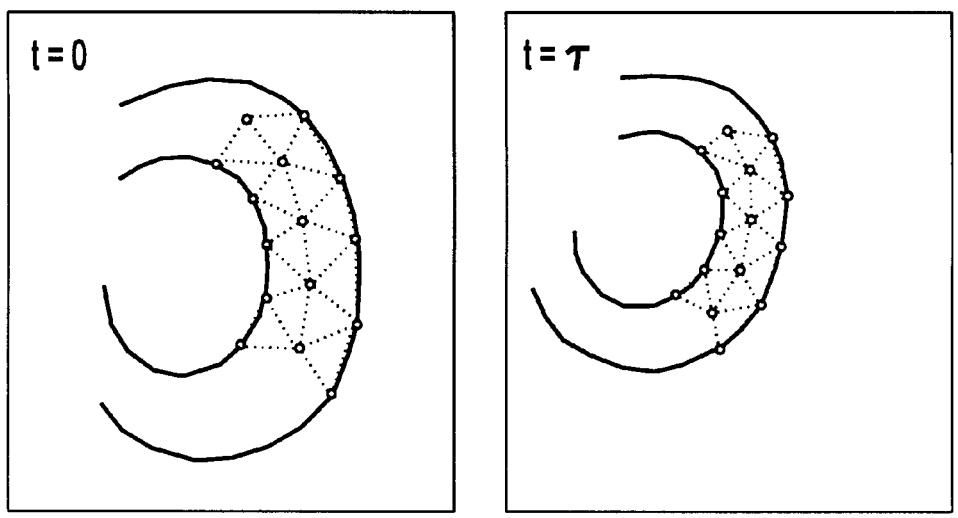
FIG. 1 illustrates a deforming mesh model.

While the inventive method can be used for many applications, it will be described in the context of the specific examples of analyzing the contraction of the heart. References made to publications in the attached appendix.

Correlation between regional myocardial ischemia and regional contractile abnormality has been the motivation for the development of approaches that assess local myocardial function by measuring motion and deformation. Recent advances in Magnetic Resonance Imaging (MRI), particularly the development of the MR tagging technique [1], [2], [3], [4], [5] and the phase contrast velocity mapping technique [6], [7], [8], [9] has enabled myocardial motion and deformation to be quantified noninvasively. Due to the noninvasive nature of the measurement process and the constantly improving quality of the resulting data, these techniques are demonstrating great potential as tools for evaluating cardiac function.

Differentiating normal and diseased states of a myocardial region based on analyzing its motion and deformation pattern may be realized by computing from the data, such local indices as radial thickening, circumferential shortening, longitudinal shortening [10], [11], [8], [12], [13], [14], strain rate tensor [7], [9], and strain tensor [5], [15], [16], [17]. As it answers the basic question of how a certain myocardial sample moves and deforms, a material description of regional deformation, in terms of one or more indices listed above, is often sought so that an integrated evaluation can be made of both the instantaneous tissue contractile state and its evolution over an extended period of time. Central to this analysis are the fundamental tasks of tracking material points and measuring stretching/contraction. With the MR tagging technique, following the establishment of a number of fiducial markers in the myocardium through spatially dependent excitation (usually applied at about end diastole), a sequence of image frames is acquired that captures the time-varying configuration of the tags as they deform along with the myocardium. In a post processing stage, establishment of marker correspondence between image frames provides samples of the displacement field. With the PC velocity imaging technique, the phase shift of spins due to their motion through magnetic field gradients is used to generate a sequence of velocity-encoded images covering a heart cycle. Temporal integration of the measured velocity field samples then yields trajectory estimates of material points (retrospectively selected within the myocardium). To further quantify regional stretching/contraction, both techniques rely on measuring the difference in motion between neighboring material points, which essentially amounts to estimating spatial derivatives of the displacement field.

Reconstructing the displacement and strain fields based on the displacement samples from MR tagging or the velocity samples from PC MRI however, is challenged by the complex nature of the heart wall motion in the spatiotemporal domain. The present invention addresses the issue of displacement and strain field recovery. Although the proposed method is presented as one oriented toward the processing of the velocity information from PC MR scans, it may be straightforward, as we shall discuss later, to adapt the method to analyze cyclic motion using or incorporating other motion information, such as MR tagging data (displacement information), and optic flow data (apparent motion information inferred from spatiotemporal intensity variation in the images).

The PC MRI technique measures a periodically-varying velocity field with respect to a fixed laboratory frame, providing data samples with finite temporal and spatial resolutions. Let the velocity field be denoted by $\vec{v}(\vec{r}, t)$ (for given $\vec{r}$ and t, it is the velocity of a material point occupying position $\vec{r}$ at time t). With measurement noise, the sampling can be expressed as:

$$\hat{\vec{v}}^{i,j,k,n} = \vec{v}(i\Delta x, j\Delta y, k\Delta z, n\Delta t) + \vec{\epsilon}_{i,j,k,n},$$

where i, j, k, and n are sample indices, $\Delta x$, $\Delta y$, $\Delta z$ and $\Delta t$ are sampling intervals, and $\vec{\epsilon}$ denotes the noise. This simplified yet useful view of the cine PC MR imaging is reasonable, as many imaging imperfections such as spatially dependent phase offsets due to eddy current effect, and temporal low-pass filtering due to cine interpolation effect, can be rectified [14]. The problem of deriving a material description of the motion and deformation, including trajectories of material points, segmental stretching/contraction, and Lagrangian strain field, based on this spatial (Eulerian) description (sampled and possibly degraded velocity fields), requires both temporal modeling and spatial modeling of the data. This is because (a) integration of material velocity samples in time requires modeling of the waveform between data samples, (b) when a material point's velocity is retrieved from the measured data for temporal integration, one generally needs an estimation scheme since velocity fields measured are Eulerian and data samples are only available at fixed grid locations, and (c) spatial/temporal differentiation must assume a model for the variation between data samples.

Dealing with nonrigidity, prior art local methods [11], [12], [13], [14], [17], [18] track motion and compute deformation by modeling the spatial and temporal variation of regional motion field. Applying the computation repeatedly with the region centered at various locations within the myocardium can provide myocardial displacement and strain field estimates. To ensure accuracy however, the size of the region must be kept small due to constraints imposed by the myocardial geometry (particularly in the radial direction) and possible high order heterogeneity. As a result, the reproducibility of the computed displacement may be limited, and that of the strain quantification may be particularly low, due to the fact that estimating spatial derivatives is highly sensitive to noise. Intuitively, compared to generally noise-sensitive local approaches, a global computation using the velocity samples from a large portion of the myocardium and all time frames can be more reproducible, and can also be more efficient in estimating the whole-body strain field. Moreover, a global model based computational method yields a structured view of the motion, which tends to facilitate quantification of the strain field and interpretation of the analysis result.

Modeling of nonrigid motion in the current case has to address the complex geometry of the ventricular myocardium and the rich temporal characteristics of the dynamics. Use of analytical shapes that have few configurating parameters (e.g., cylinders and ellipsoids) generally leads to only gross approximations of the ventricular geometry, and local refinement is often necessary to improve modeling accuracy [22]. Use of linear or other low-order polynomial temporal integration models [11], [12], [13], [18] may give rise to various degrees of error in capturing the temporal characteristics of the dynamics [14]. In the present invention, a novel spatiotemporal model of nonrigid cyclic motion is presented, and a nonrigid motion tracking method that is based on fitting the model to the velocity data is shown. With the model parameters obtained in the fitting, the displacement field can be analytically constructed, as can other quantities that are spatial/temporal derivatives of the displacement field. Modeling the continuum kinematics using a group of time-varying finite elements with the motion and deformation of each being characterized by a set of Fourier harmonics, this approach allows smooth and controllable transition from a coarse (but highly reproducible) modeling at one end, to a fine one that approaches perfect spatiotemporal modeling (at the cost of reduced reproducibility) at the other end. While the velocity data used in the examples provided is regularly sampled in space and time, it should be noted that neither the uniform spatial sampling nor the even coverage of the motion period is required to apply the method.

The standard finite element method approximates the spatial variation of a field with piecewise smooth functions [24]. It has been traditionally used as a simulation tool that provides numerical solutions to partial differential equations. Its application in modeling nonrigid motion has recently been explored, such as the physically-based elastic model of [21], and the interpolation/smoothing approaches of [16], [23]. The present invention extends the standard finite element idea by developing a time-varying basic element that simultaneously models a field's temporal behavior as well as its spatial variation. As motion and deformation field estimation is a problem of reconstructing temporal functions based on measurement data, the sampling theorem asserts that from the data one can at best accurately estimate (frequency) components of these functions with frequencies not exceeding half the sampling frequency. In the current problem where the temporal behavior is periodic, by modeling the element's variation in the temporal domain using Fourier harmonics up to half the data (temporal) sampling rate, the present approach achieves the highest accuracy supported by the data. The fitting in the temporal domain in fact can be understood as computing velocity integration in the frequency domain [14]. Prior art work on single material point tracking based on this temporal model fitting has been successful [25], [14], [26], [17]. Use of finite elements and Fourier harmonics, as is done in the present invention, facilitates coarse-to-fine transition in the modeling accuracy, allowing optimization of the balance between analysis accuracy and reproducibility (through adjustment of the fineness of the local mesh tessellation and the richness of the included Fourier harmonics).

Following descriptions of the spatiotemporal global non-rigid motion model and the tracking algorithm, we present a theoretical prediction of the analysis reproducibility, which can be quantified along with the estimated motion and deformation in each computation. A formal proof comparing the reproducibility (in terms of covariance matrices) of estimated quantities under various settings is also given to confirm the intuition that global modeling tends to be less noise-sensitive than local modeling under the current context. Use of low order finite element shape functions may give rise to discontinuity in the estimated strain field. A smoothing technique is introduced for enhancing the strain field quantification under such circumstances. Finally we present results of experiments that were conducted to validate the method and to verify the reproducibility prediction. Preliminary results of some of the experiments were presented at conferences [19], [20].

A. The Spatiotemporal Finite Element Model

The present motion tracking and strain quantification method is based on a spatiotemporal finite element mesh model of nonrigid cyclic motion. For a periodically moving and deforming object, we consider a mesh whose node points are attached to a set of material points of the underlying region of interest such that the mesh moves and deforms along with the material region. With non-overlapping time-varying basic mesh elements, such as triangular or quadrilateral elements in 2-D and tetrahedral or hexahedral elements in 3-D, the mesh constitutes a partition of the region (see FIG. 1 for a 2D example). Depending on the shape functions used in the element domain and the modeling in the temporal domain, the dynamic mesh configuration approximates the material kinematics with various degrees of accuracy.

Specifically, the partitioning mesh is initialized by selecting a set of nodal points at a reference state (t=0). The corresponding spatiotemporal trajectories of these points, along with the finite element shape functions, specify the mesh configuration at subsequent time instants and define the moving and deforming domain of each element. With the concept of isoparametric element [24], the element-wise spatial variation of the kinematics of corresponding material region is modeled as in the following. At any time t for any material point in the eth element:

$$\vec{x}^e(\vec{\xi}, t) = \sum_{a=1}^{n_{en}} N_a(\vec{\xi}) \vec{x}^e(\vec{\xi}_a, t) \quad (1)$$

$$\vec{v}^e(\vec{\xi}, t) = \sum_{a=1}^{n_{en}} N_a(\vec{\xi}) \vec{v}^e(\vec{\xi}_a, t) \quad (2)$$

In the above expressions, $a$ is the local node index, $n_{en}$ is the number of nodes in the eth mesh element, $\vec{\xi}$ is the local coordinates of the material point, and $\vec{\xi}_a$ and $N_a$ are, respectively, the local coordinates and shape function associated with the ath node. $\vec{x}^e(\vec{\xi}, t)$ and $\vec{v}^e(\vec{\xi}, t)$ represent, respectively, the trajectory and velocity of the material point, and $\vec{x}^e(\vec{\xi}_a, t)$ and $\vec{v}^e(\vec{\xi}_a, t)$ represent, respectively, the trajectory and velocity of the ath node of the eth element. Expression (1) states the form of the mapping from the eth element's current local coordinate system to the fixed lab coordinate system, and Expression (2), derived from differentiating both sides of Expression (1), is the model of the current velocity field within the element's supporting region. The shape function $N_a$ is typically chosen to be a Lagrange polynomial. In the examples presented here, we will focus on the implementation of triangular elements for 2-D problems and tetrahedral elements for 3-D problems, both with piecewise linear shape functions (1st order Lagrange polynomials). The presence of all monomials through linear terms in this implementation enables each element to exactly represent all rigid motion and homogeneous strain states.

Periodicity of motion and deformation allows the ath node's trajectory to be expressed in terms of its Fourier harmonics:

$$\vec{x}^e(\vec{\xi}_a, t) = \sum_{k=-M}^{M} \vec{g}_a^e(k) e^{j2\pi k f_0 t} \quad (3)$$

Differentiation of (3) yields the frequency component representation of the node's material velocity:

$$\vec{v}^e(\vec{\xi}_a, t) = \sum_{k=-M, k \neq 0}^{M} (j2\pi k f_0) \vec{g}_a^e(k) e^{j2\pi k f_0 t} \quad (4)$$

In (3) and (4), $f_0 = 1/T_0$ ($T_0$ = motion period) is the fundamental frequency, and k is the index of a frequency component with M being its highest value.

Expressions (1) through (4) constitute the statement of the present spatiotemporal finite element mesh model. Combining (2) and (4) leads to:

$$\vec{v}^e(\vec{\xi}, t) = \sum_{a=1}^{n_{en}} N_a(\vec{\xi}) \sum_{k=-M, k \neq 0}^{M} (j2\pi k f_0) \vec{g}_a^e(k) e^{j2\pi k f_0 t} \quad (5)$$

indicating that the present spatiotemporal finite element mesh model has the $\vec{g}_a^e(k)$'s, the Fourier coefficients of the preselected node points' trajectories, as its parameters. Given spatial and temporal samples of the velocity fields, we present in the following an algorithm that uses the model to track the deforming motion and estimate the time-varying strain field.

B. The Tracking Algorithm

As the mapping and the modeling require knowledge of mesh configuration estimates at all time instants in advance, the algorithm solves the problem iteratively. A set of selected node points defines the initial mesh configuration. We start by independently tracking these points using the Fourier tracking method [14] to initialize the mesh configuration estimates at subsequent time instants. Then, fitting the velocity data to the spatiotemporal finite element mesh model yields refined Fourier coefficient estimates of the nodal points' trajectories as well as the updated mesh configuration estimates at all time instants. The fitting+updating step is repeated until the coefficient estimates converge, or when a prespecified number of iterations has been performed. Specifically, in each iteration:

For each time instant nΔt we identify every contributing data grid point and the element domain it belongs to using the configuration estimates from the previous iteration, evaluate its corresponding $\vec{\xi}$ and $N_a(\vec{\xi})$ values, and obtain an equation of form (5).

Going through all elements and all time instants, (using the equation assembling technique from the finite element analysis theory) we systematically collect a set of linear equations with $\vec{g}_a^e(k)$'s, the Fourier coefficients of the nodal points' trajectories, as the unknowns:

Ag=v, where A depends on the mesh configuration estimates at all time instants from the previous iteration, g is the parameter vector containing the $\vec{g}_a^e(k)$'s and v collects velocity measurements.

A least squares fit yields updated $\vec{g}_a^e(k)$'s, $k \neq 0$. $\vec{g}_a^e(0)$'s can then be determined from Equation (3) using the initial conditions:

$$\vec{g}_a^e(0) + \sum_{k=-M, k \neq 0}^{M} \vec{g}_a^e(k) = \vec{x}^e(\vec{\xi}_a, 0) \quad (6)$$

When the iteration is done, the mesh configurations at all time instants and the model are used to derive other motion and deformation quantities associated with the region of interest, such as the motion of any material point (the displacement field), the deformation gradient field and the strain field. The trajectory of any material point (with initial coordinate $\vec{X}$) within the region of interest, for example, is computed as:

$$\hat{\vec{x}}(\vec{X}, t) = \hat{\vec{x}}^e(\vec{\xi}, t) = \sum_{a=1}^{n_{en}} N_a(\vec{\xi}) \hat{\vec{x}}^e(\vec{\xi}_a, t) \quad (7)$$

where e identifies the element the material point is initially located in and $\vec{\xi}$ denotes the point's local coordinates in that element. The deformation gradient tensor F in the neighborhood of the material point is computed as:

$$\hat{F}_{iJ}(\vec{X}, t) = \frac{\partial \hat{x}_i}{\partial X_J} = \sum_{a=1}^{n_{en}} \hat{x}_i^e(\vec{\xi}_a, t) \left( \sum_{j=1}^{n_{sd}} \frac{\partial N_a}{\partial \xi_j} \frac{\partial \xi_j}{\partial X_J} \right) \quad (8)$$

where $n_{sd}$ denotes the number of spatial dimensions (e.g., $n_{sd}=2$ for 2-D problems). Expression (8) can be efficiently evaluated for the triangular or tetrahedral linear elements, using analytically derived partial derivative expressions. It is to be noted that each time-varying component of the estimated motion trajectory and deformation gradient tensor turns out to be a linear combination of the Fourier coefficients of the nodal points' trajectories. Organizing the estimated values of the component at all time instants into a vector form, we may express the vector as $\hat{y}=Dg$, where D is a matrix that collects in the right order the corresponding combination coefficients.

C. Reproducibility Analysis

Reproducibility of the computed motion and deformation, as measured by corresponding covariance matrices, can be analyzed after each computation. Assuming the noise in the velocity component measurements are uncorrelated with mean zero and identical variance $\sigma_v^2$, and ignoring the slight perturbation to $A^T A$ caused by the noise in the mesh configuration estimates, we can readily show that:

$$\text{Cov}(g) = \sigma_v^2 (A^T A)^{-1} \quad (9)$$

where the superscript T denotes matrix transpose (conjugate transpose, if complex rather than real equations of form (5) are assembled). Being a linear combination of the Fourier coefficients, $$\text{Cov}(\hat{y}) = \sigma_v^2 D(A^T A)^{-1} D^T \quad (10)$$

$\sigma_v^2$, the measurement noise variance, may be estimated from the fitting residual (the estimate is unbiased for a fitting model of high accuracy):

$$\hat{\sigma}_v^2 = \frac{RSS}{\text{degrees of freedom for residue}}$$

where RSS is the residual sum of squares, and the degrees of freedom is the difference between the number of rows and the number of columns in A. Using this estimate of $\sigma_v^2$ in Equations (9) and (10), we obtain a prediction for the estimated quantities' reproducibility.

The belief that a global computation tends to yield more reproducible results than local approaches can be formally proved. The Appendix shows a proof for two general cases. In the first case, extending an initial mesh model by incorporating additional elements that are coupled to the original elements and are sufficiently supported by corresponding data is shown to result in increased reproducibility of the motion and deformation estimates. In the second case, with the support of more data (due to more available measurements), motion analysis using the same mesh modeling is shown to be at least as precise as that without the new data.

D. Lagrangian Strain Field Computation

The mutually orthogonal principal components of the Lagrangian finite strain tensor E (defined as $E=(F^T F - I)/2$) completely characterize how a local segment with arbitrary initial state changes in size and shape, and is thus appropriate for use as an index of regional deformation state. However, as it essentially relies on measuring the difference in motion between neighboring material points (estimating spatial derivatives), quantification of the strain field is inherently more noise-sensitive than reconstructing the displacement field. In addition, use of low order polynomial shape functions may not constrain the spatial derivatives to be continuous across element boundaries [24]. Therefore smoothing of the strain field estimation that is directly computed from $\hat{E} = (\hat{F}^T \hat{F} - I)/2$ is often desired.

Assuming element-wise homogeneous strain, the present spatiotemporal model implementation uses linear shape functions. A straightforward reconstruction of the strain field according to $\hat{E} = (\hat{F}^T \hat{F} - I)/2$ where $\hat{F}$ denotes the deformation gradient computed using Equation (8) may introduce significant error quantifying the whole strain field, especially in the neighborhood of the element boundaries. To improve the overall quality of the continuous strain field estimation, we introduce smoothing [24] by solving the following optimization problem for each component of the strain tensor $$\min \int_\Omega (\tilde{E} - \hat{E})^2 d\Omega \quad (11)$$

where $\hat{E}$ denotes a component of the element-wise constant strain field estimation (from $\hat{E} = (\hat{F}^T \hat{F} - I)/2$), and the minimization is over all continuous and element-wise linear functions $\tilde{E}$. This formulation translates into solving linear equations assembled using techniques from the finite element analysis theory. The result is a continuous strain field estimate whose element-wise spatial variation is constrained to be linear.

A. Computer Simulation

Figure 2:
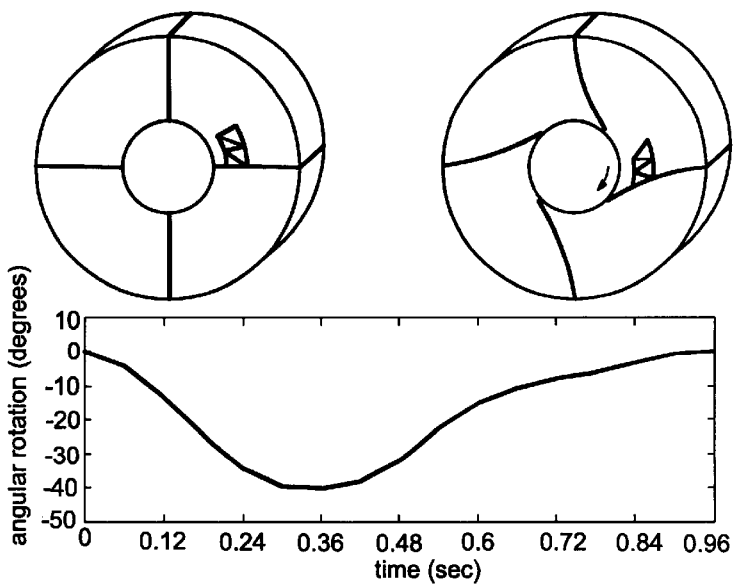
FIG. 2 illustrates a simulated deforming object at two time instants and angular rotation and shear thereof.

The method was evaluated with computer synthesized data of an object undergoing 2-D nonuniform deformation (rotational shear). The object consisted of a stationary outer cylindrical shell ($R_o=47.6$ mm), a periodically rotating inner cylinder ($R_i=18.4$ mm), and deforming material between the two (FIG. 2). The rotation of the inner cylinder $\theta(t)$ was specified as a waveform with period $T_0=0.96$ s and peak-to-peak excursion of 41 degrees. At radius R within the deforming material the rotation was $\theta_R(t)=\theta(t)\times(R_o^{-2}-R^{-2})/(R_o^{-2}-R_i^{-2})$ [27].

To validate the tracking method and verify the error analysis, a first study used single transaxial slice data with $1.2\times1.2$ mm$^2$ resolution and 16 time frames covering the 0.96 s period. White Gaussian noise with a standard deviation of 0.15 cm/s was added to both $v_x$ and $v_y$ components of the velocity data, corresponding to an apparent SNR of 45 with velocity encoding strength $v_{enc}=15$ cm/s. A set of nodal points was preselected to define an initial mesh configuration covering part of the deforming annular region (FIG. 2). The mesh was composed of a single element (filled triangle) in case A, and all four elements in the case B. In each case, the algorithm described in II-B was used to compute the Fourier coefficients of the nodal points' trajectories. For each mesh element and each time instant, the center point position $\vec{x}_e$, the deformation gradient tensor F, and the strain tensor E were derived from the model and the coefficients. These were compared to the true values. A total of 1000 experiments were performed for each case to measure the mean and standard deviation of the quantities. The study was repeated for SNR=15.

To further examine the ability of the method to quantify the displacement and strain fields, in a second study, a much extended mesh was applied to analyze a single transaxial slice (with the same data resolutions and SNR as above). At the reference state (t=0), user-selected node points defined an initial mesh covering the inner portion of the annular region where the material deforms with great amplitude. The node points were individually tracked to initialize the mesh configuration estimates at subsequent time instants. Iteratively fitting the velocity data to the spatiotemporal finite element mesh model led to refined estimates of the mesh configuration. The displacement field and (element-wise constant) strain field $\hat{E}$ were then derived. Solving the minimization problem (Expression (11)) subsequently provided a continuous strain field estimate for each time instant.

A third study evaluated a 3-D implementation. A total of 5 transaxial slices simulated a volumetric data set with $1.2\times1.2\times2.4$ mm$^3$ resolution. The temporal resolution and SNR were kept the same. An initial mesh covering about a quarter of the annular volume was prescribed, and then analyzed following the same steps as in the second study.

B. In Vitro and In Vivo Studies

To evaluate the analysis method in actual experimental studies, a phantom [28] with an identical geometry to the object described above was imaged. The outer and inner cylinders were made of acrylic ($R_i=18.4$ mm, $R_o=47.6$ mm). The deformable material in between was a silicone gel (Silgard, Primerless Dielectric Gel 527, Dow Corning, Midland, Mich.), mixed as one part catalyst to one part resin. The motion of the inner cylinder was computer controlled with a period of 0.96 s and simulated physiological velocity and displacement. For tracking performance evaluation, 12 beads were embedded inside the gel (identifiable in magnitude images with appropriate slice prescription). Velocity data for a single axial slice were collected using a 1.5T MRI system (Signa Horizon, GE Medical Systems, Milwaukee, Wis.), with a quadrature head coil and a phase contrast cine spoiled GRE sequence. The peak-to-peak angular excursion of the inner cylinder was 41°. Other acquisition parameters were TR=18 ms, FOV=30 cm, TE=7 ms, flip angle=30°, slice thickness=7 mm, $V_{enc}=20$ cm/s, $256\times256$ acquisition matrix and 2 NEX. The acquired data were processed in the same way as in the 2-D simulation study.

Apparatus for collecting data that can be used with the present method are known in the art. See for example U.S. Pat. No. 5,615,677.

To test the method in vivo, cine PC data were acquired of a patient with an idiopathic hypertrophic subaortic stenosis. A midventricular transaxial slice was imaged using the product cine PC sequence, TR/TE=30/8.9 ms, $v_{enc}=20$ cm/s, $256\times256$ matrix, 32 cm FOV, 10 mm slice thickness, 16 time frames, and synchronization using the ECG signal. An initial mesh covering much of the left ventricular wall was prescribed and analyzed.

As another potential in vivo application, cyclic motion of the biceps was examined. Parameters similar to those above were used to image a sagittal plane of a human volunteer's upper arm while the subject was performing a repeated biceps curl exercise at a rate of 35 cycles/min. The data collection was synchronized to the motion cycle by an optical transducer. Twenty four temporal frames were acquired. An initial mesh covering part of the biceps was defined and analyzed.

C. Results

Figure 3:
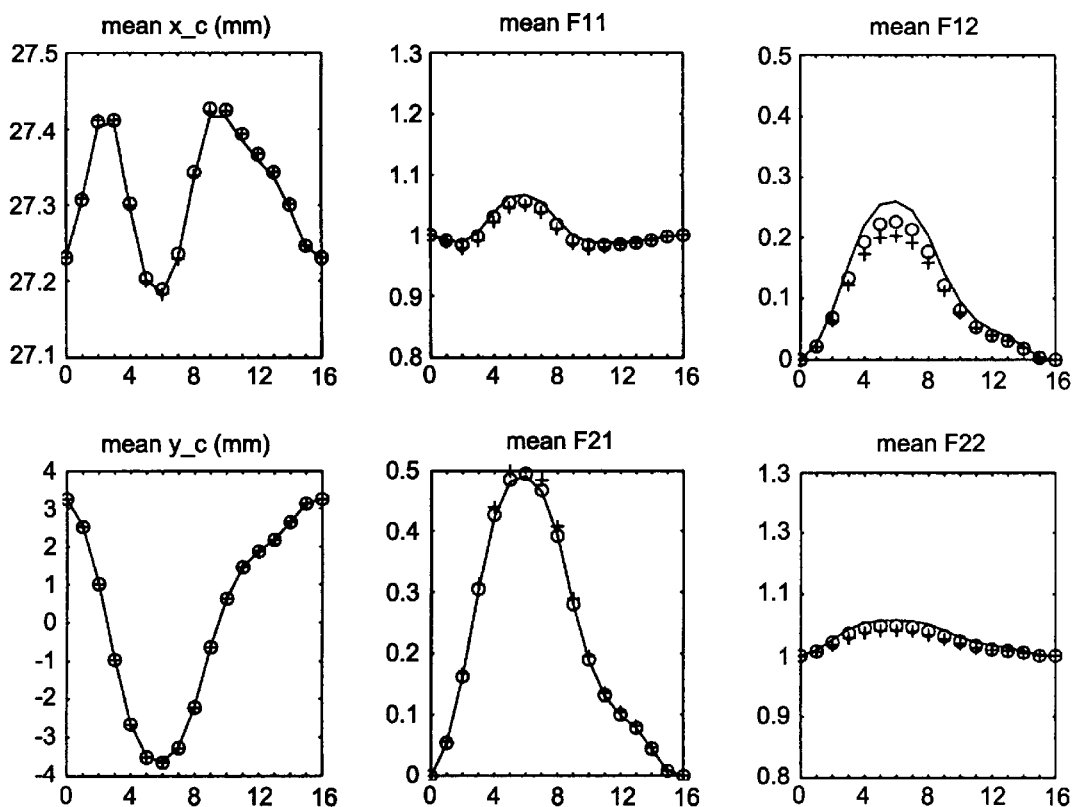
FIGS. 3 and 4 are graphs illustrating mean and standard deviations of computed quantities of a single mesh element model and an extended mesh element model.
Figure 4:
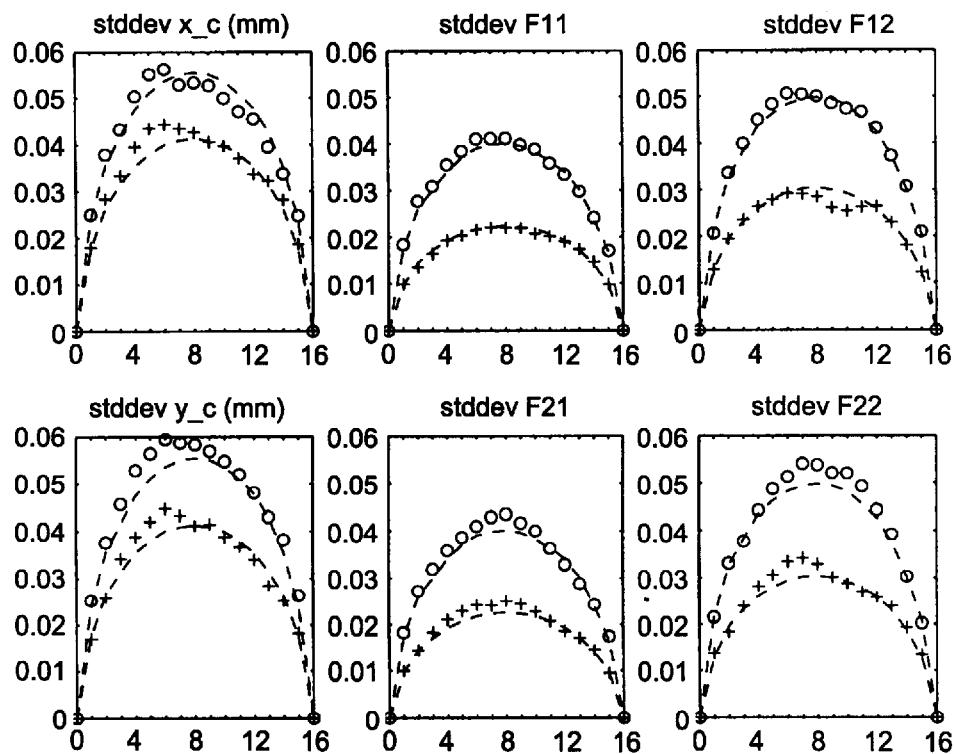

For the first simulation study, FIGS. 3 and 4 show the mean and standard deviation, respectively, of the computed quantities (center point position and deformation gradient) within the filled triangle in two cases: single mesh element (local) modeling of this region (case A) and extended mesh element modeling in which the other three elements were also included in the analysis (case B). In both cases, the averages of the estimated quantities were in excellent agreement with the true values (FIG. 3). The theoretically predicted and experimentally measured standard deviations also agreed well (FIG. 4). FIGS. 3 and 4 further show that the extended mesh modeling resulted in lower standard deviation but comparably high accuracy. This is consistent with the theoretical prediction. Under the present situation, adding neighboring elements to the analysis reduced the standard deviations of the computed quantities within the filled triangle by a factor of up to 2. The good agreement and the conclusions held true when the study was repeated at SNR=15, corresponding to a noise standard deviation in the velocity data of 0.45 cm/s.

Figure 5A:
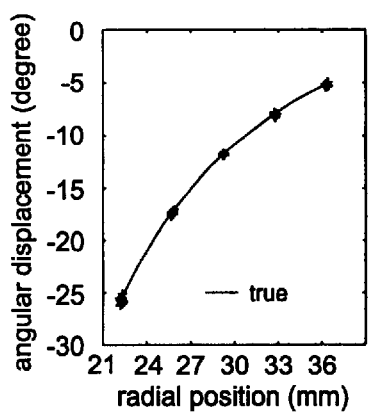
FIGS. 5(a), 5(b) illustrate computed angular displacement and maximum principal strain at a time frame 7.
Figure 5B:
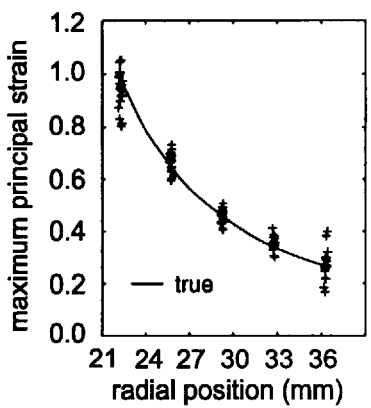

Use of a greatly extended (global) mesh that covered over a half of the deforming annulus region, allowed the performance of the method for analyzing the displacement and strain fields across a large space to be studied. The computed fields at multiple radial and angular positions were examined. FIG. 5(a) and (b) show, respectively, computed angular displacement and maximum principal strain at time frame 7 (about maximum deformation) as a function of radial position. As the comparison with the true values demonstrated, the computed displacements were very accurate and precise, and the strain quantification approach that included the smoothing process was capable of reconstructing the strain field with high accuracy and good reproducibility.

Figure 6:
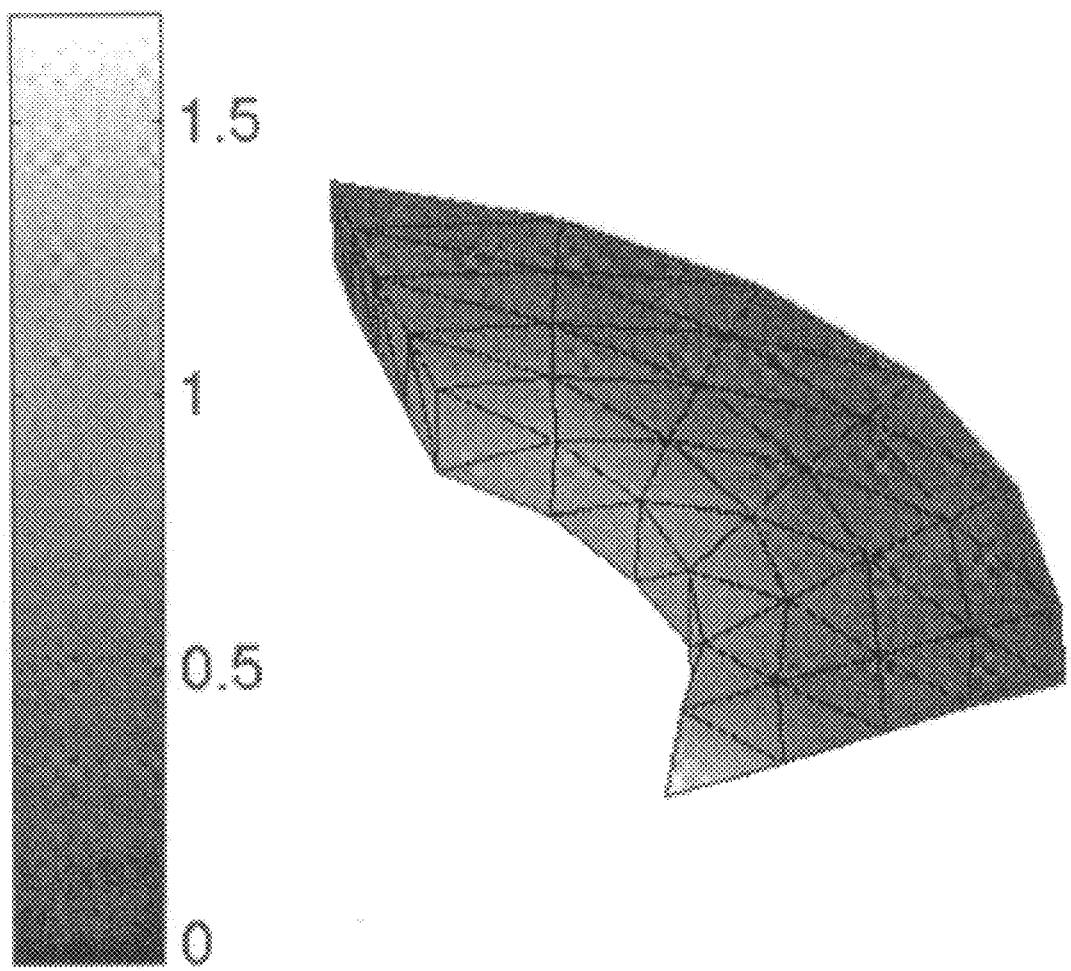
FIG. 6 illustrates reconstructed maximum principal strain field.
Figure 7A:
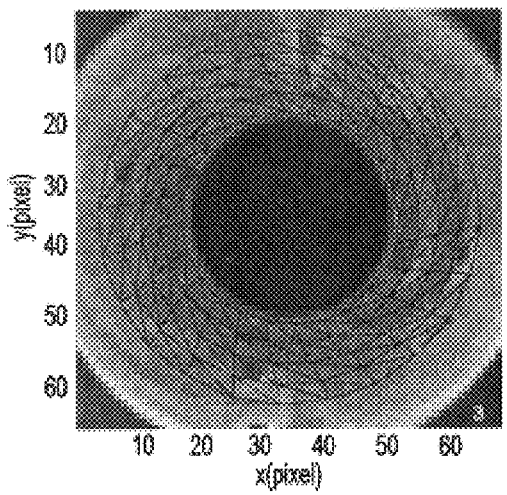
FIGS. 7(a)–(d) illustrate magnitude image frames 3, 7, 11 and 15 (out of 16) during a whole motion cycle.
Figure 7B:
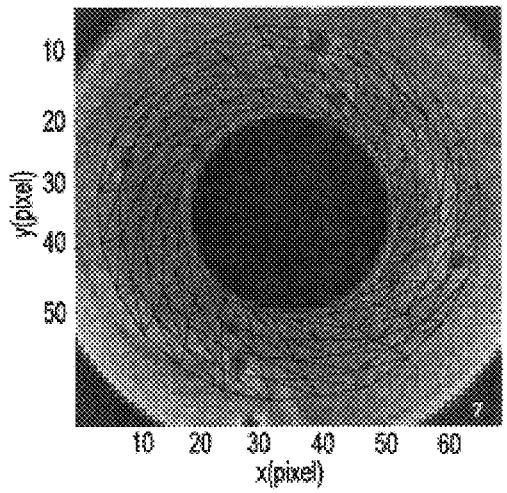
Figure 7C:
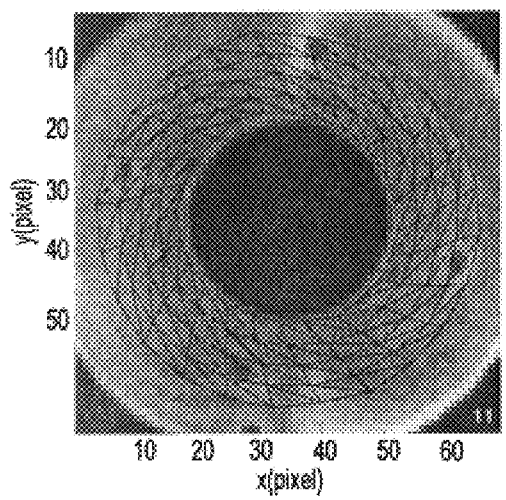
Figure 7D:
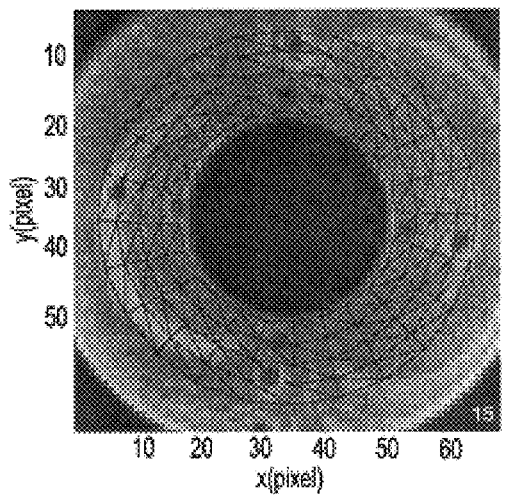

Results from the 3D implementation of the method and volumetric data from the third simulation study were also in good agreement with the true values. FIG. 6 shows the reconstructed maximum principal strain field evaluated on the surface of the estimated mesh configuration at time frame 7 by displaying various strain levels as shades of grey. Such display of deformation state of the underlying material region is easily interpreted visually. Since the present method reconstructs the time-varying strain field over the whole volume of interest, volumetric rendering of the functional index with interactive user guidance and cine display is possible and is expected to be more intuitive and informative than numerical or other graphical formats.

Figure 8:
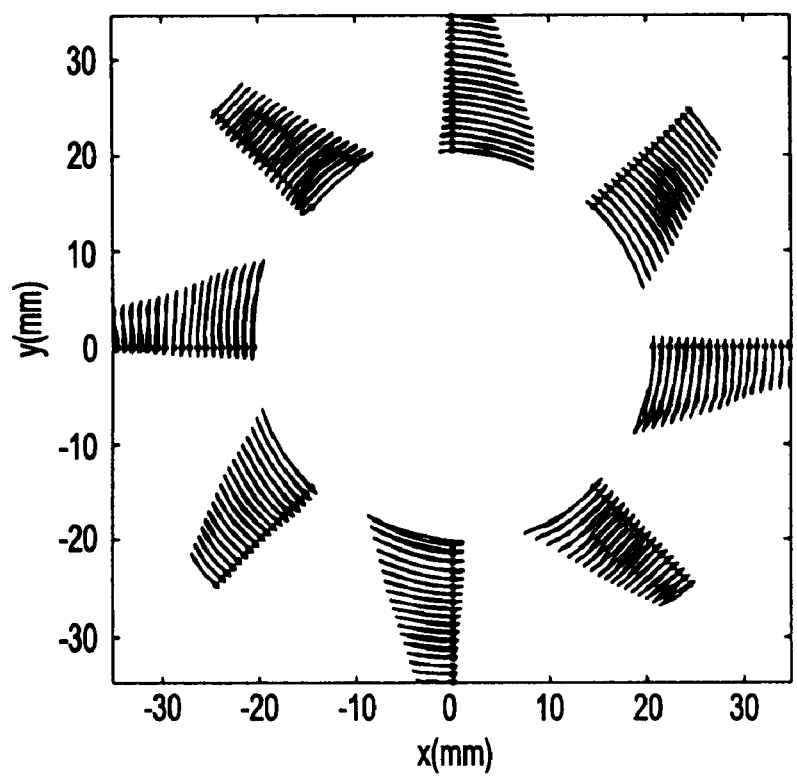
FIG. 8 illustrates computed trajections for evenly spaced material points.

For the in vitro phantom study where a cine PC data set for a single transaxial slice was acquired and used to analyze the in-plane motion and deformation, FIG. 7 shows magnitude image frames 3, 7, 11, and 15 (out of 16) during a whole motion cycle, with the tracked mesh configuration at corresponding time instants each shown as an overlay on the associated image. With the estimated time-varying displacement field (material description), the spatiotemporal trajectory of any material point initially located within the tracked material region can be readily computed. FIG. 8 shows computed trajectories (with the initial locations marked as circles) for 20 evenly spaced material points along each of eight user-defined line segments. The location of the fiducial marks embedded in the deforming material are visible as regions of reduced signal in FIG. 7. Good agreement is seen between the actual motion as evidenced by the beads and the computed motion as portrayed by the overlayed mesh.

Figure 10:
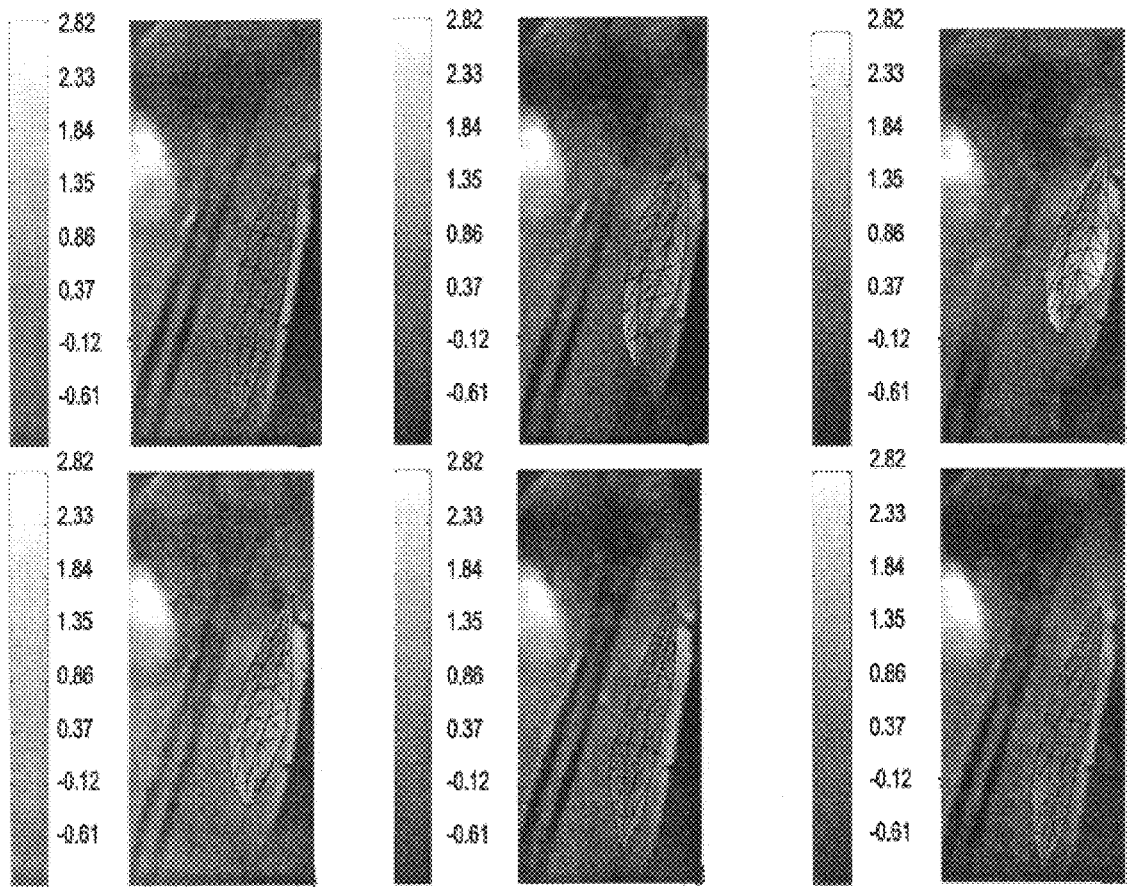

FIGS. 9 and 10 show respectively, the estimated principal strain distribution for the two in vivo studies in a manner similar to that used in FIG. 6. FIG. 9 (image frames 3, 7, 11, and 15 out of 16) suggests the presence of a nonuniform contraction pattern in the circumferential direction near end systole. For the biceps study, FIG. 10 (image frames 2, 6, 10, 14, 18 and 22 out of 24) reveals some features of the muscle deformation. Most noticeable appears to be a significant heterogeneity along the fiber direction at about the mid-point into the cycle.

IV. DISCUSSION AND CONCLUSION

While the method was described above for processing the velocity data measured using PC MR scans, it is directly suitable for processing velocity information from other sources such as optic flow and Doppler ultrasound. The flexibility is largely due to the controllable model configuration (definition of initial mesh geometry and tessellation, use of finite element shape functions, and inclusion of Fourier harmonics) and the fact that the velocity modeling (Equation (5)) does not require the data to be uniformly sampled in space or time.

Some techniques allow displacement information to be extracted. The displacement information, for example, can be inferred from temporal feature correspondence established through matching over time unique patterns, e.g., surgically implanted markers [29], [30], bifurcation points of coronary arteries [31], [32], and curvature-based features on myocardial boundaries [33], [34]. With the MR tagging technique which noninvasively creates a large number of fiducial marks that move along with the underlying tissue, the displacement information can be extracted from the acquired images with particularly high fidelity [5], [22]. The present method is immediately adaptable to processing displacement information through displacement field modeling:

$$\Delta \vec{x}^e(\vec{\xi}, t) = \sum_{a=1}^{n_{en}} N_a(\vec{\xi}) \sum_{k=-M}^{M} \vec{g}_a^e(k)(e^{j2\pi k f_o t} - 1) \quad (12)$$

From the MR tagging data in particular, tag line detection typically generates for each tag point, the component of its displacement vector that is orthogonal to its corresponding initial tag plane. Based on such displacement information, component-wise form of Equation (12) can be readily used to reconstruct the displacement field. Furthermore, by incorporating both velocity modeling and displacement modeling, the present method can provide a unifying framework that integrates information from various sources. A (weighted) least squares solution to a set of equations of form (5) or (12) for example, may represent an optimal integration of velocity data (from velocity imaging and optic flow) and displacement data (from correspondence established from trackable intensity features).

Assuming the input data is reasonably accurate, motion tracking and strain quantification accuracy is then primarily determined by the shape functions used, the mesh element sizes specified and the Fourier harmonics included. In theory, as the finite element mesh is further and further refined, the displacement field associated with the object's motion and its spatial derivatives approach constant values over each element domain, ensuring the spatial variation of the motion to be represented with sufficient accuracy. Alternatively, increasing the order of the polynomial shape functions while retaining the same mesh element dimensions will also improve model accuracy. However, due to the finite spatial resolution of the data, one cannot arbitrarily refine the mesh or increase the order of the shape functions without rendering the problem ill-posed. As the determination of the model parameters is not sufficiently supported by the data, the matrix A becomes singular. The situation is similar with the temporal modeling. Higher accuracy in the temporal domain is achievable by including more Fourier harmonics, with a limit that the highest harmonic frequency must not exceed half the temporal sampling frequency.

Of equal importance, we note that as we refine the spatial/temporal modeling for higher accuracy, the reproducibility of the estimates tends to get worse (prior to reaching the ill-posedness extreme). This tradeoff between accuracy and reproducibility is intrinsic to the modeling process, but with the present method a good balance is achievable. In the spatial domain, the tradeoff can be handled by appropriately adjusting the initial mesh definition, making the elements' sizes match expected local deformation heterogeneity. In the temporal domain, smoothing can be introduced by incorporating low pass filtering (attaching appropriate weights to the exponentials in Equation (5)) [14]. Guidance from the computed covariance matrix could be helpful when adjusting the initial mesh definition and the filtering weights. Alternatively, one can introduce regularization into the modeling to restore well-posedness or improve reproducibility, which may be particularly effective when data is under-sampled or nonuniformly-sampled.

The computed motion and deformation for a single element with the present method and with the previous local method [17] have about the same reproducibility. With the present method, extending the finite element mesh by adding more elements achieves improved reproducibility. At the same time, due to the element-wise parameterization, high estimation accuracy, comparable to that of the local method, can still be obtained.

In summary, we have presented a spatiotemporal model that is composed of time-varying finite elements, with the nonrigid motion of each characterized by a set of Fourier harmonics. The model is suitable for accurately modeling the kinematics of a cyclically moving and deforming object with complex geometry, such as that of the myocardium. The model has controllable built-in smoothing in space and time for achieving satisfactory reproducibility in the presence of noise. Velocity data measured, with PC MRI for example, can be used to quantify motion and deformation by fitting the model to data. Validation with experiments indicates the method is capable of providing high quality motion/deformation estimates using cine PC data. In particular, compared with noise-sensitive local approaches, the present method tends to yield estimates with higher reproducibility. When assessing cardiac function in a clinical setting, a further advantage with the present method is that a theoretical prediction of the analysis reproducibility can be generated simultaneously with the motion/deformation estimates.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

APPENDIX

Case 1 We would like to show that an extended mesh modeling (through extending an initial mesh model by incorporating additional elements that are coupled to the original elements and are sufficiently supported by corresponding data) out performs the initial modeling in terms of estimation reproducibility.

Consider the system of equations that corresponds to the initial modeling:

$$A_{11}x_1 \approx b_1 \quad (13)$$

where $A_{11}$ is full rank (the problem of determining the model parameters from the data is well-posed), and $Cov(b_1)=\sigma^2 I_1$ (data noise are uncorrelated with mean zero and identical variance $\sigma^2$). The solution to this least squares problem is $$\hat{x} = (A_{11}^T A_{11})^{-1} A_{11}^T b_1 \quad (14)$$

The covariance matrix of the estimated $\hat{x}_1$ is $$Cov(\hat{x}_1) = \sigma^2 (A_{11}^T A_{11})^{-1} \quad (15)$$

Now consider the system of equations that corresponds to extending the initial modeling by using more elements:

$$\underbrace{\begin{bmatrix} A_{11} & 0 \\ A_{21} & A_{22} \end{bmatrix}}_{A} \underbrace{\begin{bmatrix} x_1 \\ x_2 \end{bmatrix}}_{x} \approx \underbrace{\begin{bmatrix} b_1 \\ b_2 \end{bmatrix}}_{b} \quad (16)$$

where $x_2$ denotes the additional model parameters (due to the added elements), A is full rank, and $Cov(b)=\sigma^2 I$. The solution to this least squares problem is $$\hat{x} = (A^T A)^{-1} A^T b \quad (17)$$

The covariance matrix of the estimated $\hat{x}$ is $$Cov(\hat{x}) = \sigma^2 (A^T A)^{-1} = \sigma^2 \begin{bmatrix} A_{11}^T A_{11} + A_{21}^T A_{21} & A_{21}^T A_{22} \\ A_{22}^T A_{21} & A_{22}^T A_{22} \end{bmatrix}^{-1} \quad (18)$$

The (1,1) block of $Cov(\hat{x})$ is the covariance matrix of the estimated $\hat{x}_1$, and can be shown to be $$Cov(\hat{x}_1) = \sigma^2 \left(A_{11}^T A_{11} + A_{21}^T A_{21} - A_{21}^T A_{22}(A_{22}^T A_{22})^{-1} A_{22}^T A_{21}\right)^{-1} \quad (19)$$

$$= \sigma^2 \left(A_{11}^T A_{11} + A_{21}^T (I - A_{22}(A_{22}^T A_{22})^{-1} A_{22}^T) A_{21}\right)^{-1} \quad (20)$$

Noticing that $A_{21}^T(I-A_{22}(A_{22}^T A_{22})^{-1} A_{22}^T)A_{21}$ is symmetric and positive semidefinite ($I-A_{22}(A_{22}^T A_{22})^{-1} A_{22}^T$ is a projection matrix), we have $$\forall g \neq 0,\, g^T(A_{11}^T A_{11} + A_{21}^T A_{21} - A_{21}^T A_{22}(A_{22}^T A_{22})^{-1} A_{22}^T A_{22}^T A_{21})g \geq g^T(A_{11}^T A_{11})g \quad (21)$$

The symmetric and positive definite matrix $A_{11}^{-T} A_{11}$ admits factorization in the form $LL^T$ (L invertible). Inequality (21) thus implies $$\lambda_{min}(L^{-1}(A_{11}^T A_{11}+A_{21}^T A_{21}-A_{21}^T A_{22}(A_{22}^T A_{22})^{-1} A_{22}^T A_{21})L^{-T}) \geq 1 \quad (22)$$

which further leads to $$\lambda_{max}(L^T(A_{11}^T A_{11}+A_{21}^T A_{21}-A_{21}^T A_{22}(A_{22}^T A_{22})^{-1} A_{22}^T A_{21})^{-1} L) \leq 1 \quad (23)$$

The implication of (23) that $$\forall h \neq 0,\, h^T(A_{11}^T A_{11}+A_{21}^T A_{21}-A_{21}^T A_{22}(A_{22}^T A_{22})^{-1} A_{22}^T A_{21})^{-1} h \leq h^T(A_{11}^T A_{11})^{-1} h \quad (24)$$

directly shows that for any quantity that is computed as a linear combination of $\hat{x}_1$, using $\hat{x}_1$ from (16) achieves a reproducibility that is at least as good as using $\hat{x}_1$ from (13).

Case 2 We would like to show that when the mesh model stays the same, with the support of more data (due to more available measurements), the estimate is at least as precise as that without the additional data.

Consider the system of equations (augmented from the initial system $A_1 x \approx b_1$, due to more available data):

$$\underbrace{\begin{bmatrix} A_1 \\ A_2 \end{bmatrix}}_{A} x \approx \underbrace{\begin{bmatrix} b_1 \\ b_2 \end{bmatrix}}_{b} \quad (25)$$

where $A_1$ is full rank, and $Cov(b)=\sigma^2 I$. The solution to this least squares problem is $$\hat{x} = (A^T A)^{-1} A^T b \quad (26)$$

The covariance matrix of the estimated $\hat{x}$ is $$Cov(\hat{x}) = \sigma^2 (A^T A)^{-1} = \sigma^2 (A_1^T A_1 + A_2^T A_2)^{-1} \quad (27)$$

An argument similar to that of the previous case then leads to the conclusion that $(A_1^T A_1)^{-1} - (A^T A)^{-1}$ is positive semidefinite, implying that for this case where the mesh model stays the same incorporating more data tends to improve the reproducibility of the estimate.

REFERENCES

[1] E. Zerhouni, D. Parish, W. Rogers, A. Yang, E. Shapiro, Human heart: tagging with MR imaging—a method for noninvasive assessment of myocardial motion. *Radiology* 169: 59–63 (1988).

[2] L. Axel, L. Dougherty, MR imaging of motion with spatial modulation of magnetization. *Radiology* 172: 349–350 (1989).

[3] L. Axel, L. Dougherty, Heart wall motion: improved method of spatial modulation of magnetization for MR imaging. *Radiology* 172: 349–350 (1989).

[4] L. Axel, Three-dimensional MR imaging of heart wall motion. *Radiology* 173: 233 (1989).

[5] E. R. McVeigh, E. Zerhouni, Noninvasive measurement of transmural gradients in myocardial strain with MR imaging. *Radiology* 180: 677–683 (1991).

[6] P. Van Dijk, Direct cardiac NMR imaging of heart wall and blood flow velocity. *Journal Computer Assisted Tomography* 8: 429–436 (1984).

[7] V. J. Wedeen, Magnetic resonance imaging of myocardial kinematics. Technique to detect, localize, and quantify the strain rates of active human myocardium. *Magn. Reson. Med.* 27: 52–67 (1992).

[8] N. J. Pelc, R. J. Herfkens, A. Shimakawa, D. R. Enzmann, Phase Contrast Cine Magnetic Resonance Imaging. *Magnetic Resonance Quarterly* 7: 229–254 (1991).

[9] N. J. Pelc, R. J. Herfkens, L. R. Pelc, 3D analysis of myocardial motion and deformation with phase contrast cine MRI. *Proc. SMRM* 18 (1992).

[10] N. R. Clark, N. Reicheck, P. Bergey, E. A. Hoffman, D. Brownson, L. Palmon, L. Axel, Circumferential Myocardial Shortening in the Normal Human Left Ventricle. *Circulation* 84: 67–74 (1991).

[11] R. J. Herfkens, N. J. Pelc, L. R. Pelc, J. R. Sayre, Right ventricular strain measured by phase contrast MRI. *Proc. SMRM.* 163 (1991).

[12] R. T. Constable, K. M. Rath, A. J. Sinusas, J. C. Gore, Development and evaluation of tracking algorithms for cardiac wall motion analysis using phase velocity MR mapping. *Magn. Reson. Med.* 32: 33–42 (1994).

[13] N. J. Pelc, M. Drangova, L. R. Pelc, Y. Zhu, D. Noll, B. Bowman, R. J. Herfkens, Tracking of cyclical motion using phase contrast cine MRI velocity data. *JMRI* 5:339–345 (1995).

[14] Y. Zhu, M. Drangova and N. J. Pelc, Fourier tracking of myocardial motion using cine PC data. *Magn. Reson. Med.* 35: 471–480 (1996).

[15] L. Axel, R. C. Goncalves, D. Bloomgarden, Regional heart wall motion: two-dimensional analysis and functional imaging with MR imaging. *Radiology* 183: 745–750 (1992).

[16] A. A. Young and L. Axel, Three-dimensional motion and deformation of the heart wall: estimation with spatial modulation of magnetization—a model-based approach. *Radiology* 185:241–247 (1992).

[17] Y. Zhu, M. Drangova and N. J. Pelc, Estimation of deformation gradient and strain from cine-PC velocity data. IEEE Transactions on *Medical Imaging* vol. 16, no. 6, pp. 840–851 (1997).

[18] A. Lingemneni, P. A. Hardy, K. Powell, N. J. Pelc, R. D. White, Validation of cine phase-contrast MR imaging for motion analysis. *JMRI* 5: 331–338 (1995).

[19] Y. Zhu and N. J. Pelc, Myocardial function analysis using a spatiotemporal finite element mesh model and cine-PC velocity data. *Proc. of the 5th meeting of the ISMRM*, p. 464 (1997).

[20] Y. Zhu and N. J. Pelc, A spatiotemporal finite element mesh model of cyclical deforming motion and its application in myocardial motion analysis using phase contrast MR images. *Proc. IEEE International Conference on Image Processing*, vol II, pp. 117–120 (1997).

[21] A. Pentland and B. Horowitz, Recovery of nonrigid motion and structure. *PAMI*, vol. 13, no. 7 (1991).

[22] W. G. O'Dell, C. C. Moore, W. C. Hunter, E. A. Zerhouni and E. R. McVeigh, Displacement field fitting for calculating 3D myocardial deformations from tagged MR images. *Radiology.* 195:829–835 (1995).

[23] F. G. Meyer, R. T. Constable, A. J. Sinusas, J. S. Duncan, Tracking Myocardial Deformation Using Phase Contrast MR Velocity Fields: A Stochastic Approach. *IEEE Trans. Med. Imaging* vol. 15, no. 4: 453–465 (1996).

[24] T. J. R. Hughes. *The Finite Element Method: Linear Static and Dynamic Finite Element Analysis*, Prentice-Hall (1987).

[25] Y. Zhu, M. Drangova and N. J. Pelc, Fourier tracking of myocardial motion using cine PC data. *Proc. of the 2nd meeting of the Society of Magnetic Resonance*, p. 1477 (1994).

[26] M. Drangova, Y. Zhu, B. S. Bowman and N. J. Pelc, In vitro verification of myocardial-motion tracking from phase-contrast velocity data. *Magnetic Resonance Imaging* (accepted).

[27] A. A. Young, L. Axel, L. Dougherty, D. K. Bogen and C. S. Parenteau, Validation of Tagging with MR Imaging to Estimate Material Deformation. *Radiology* 188:101–108 (1993).

[28] M. Drangova, B. Bowman and N. J. Pelc, Physiologic motion phantom for MRI applications. *JMRI* 6:513–518 (1996).

[29] D. C. Harrison, A. Goldblatt, E. Braunwald, G. Glick and D. T. Mason, Studies on cardiac dimensions in intact unanesthetized man. *Circulation Research*, 13:448–467 (1963).

[30] G. Daughters, W. Sanders, D. Miller, A. Schwarzkopf, C. Mead and N. Ingels, A comparison of two analytical systems for 3-D reconstruction from biplane videoradiograms. *Computers in Cardiology*, 15:79–82 (1989).

[31] H. C. Kim, B. C. Min, M. M. Lee, J. D. Seo, Y. W. Lee and M. C. Han, Estimation of local cardiac wall deformation and regional wall stress from biplane coronary cineangiograms. *IEEE Trans. Biomed. Eng.* 32:503–511 (1985).

[32] C. W. Chen and T. S. Huang, Epicardial motion and deformation estimation from coronary artery bifurcation points. *Proc. of 3rd International Conference on Computer Vision*, pp. 456–459 (1990).

[33] A. Amini and J. Duncan, Pointwise tracking of left-ventricular motion in 3-D. *Proc. IEEE Workshop on Visual Motion*, pp. 294–298 (1991).

[34] S. K. Mishra and D. B. Goldgof, Motion analysis and modeling of epicardial surfaces from point and line correspondences, *Proc. IEEE Workshop on Visual Motion*, pp. 300–305 (1991).

What is claimed is:

1. A method of motion analysis of a moving region within an object comprising the steps of:

a) defining a dynamic mesh within said region, said mesh composed of non-overlapping elements each specified by a set of node points, b) acquiring motion data for a set of locations within said region for a plurality of time frames, wherein at least some of the locations for which motion data are acquired do not correspond to a node point of any mesh element, c) defining a spatiotemporal model of the region which relates the kinematics of the node points to the acquired motion data, and d) computing the motion and deformation of the moving region using the motion data and said model.

2. The method as defined by claim 1 wherein said elements are two dimensional.

3. The method as defined by claim 2 wherein said elements are triangles.

4. The method as defined by claim 1 wherein said elements are three-dimensional.

5. The method as defined by claim 4 wherein said elements are tetrahedrons.

6. The method as defined by claim 1 wherein in step c) the motion is modeled as being periodic with period $1/f_o$ and the trajectory of a node point is modeled as a Fourier series:

$$\vec{x}^e(\vec{\xi}_a, t) = \sum_{k=-M}^{m} \vec{g}_a^e(k) e^{j2\pi k f_0 t}$$

where the superscript e is the index of the element containing the node point, a is the index of the node point, $\vec{x}^e(\vec{\xi}_a,t)$ is the trajectory of the node point, t is time within the motion period, $\vec{g}_a^e$ is a Fourier coefficient, and k is the index of the Fourier series.

7. The method as defined by claim 6 wherein step d) includes a least squares fit for the coefficients $\vec{g}_a^e(k)$.

8. The method as defined by claim 7 wherein a fitting residual is used to estimate uncertainty in motion data as follows:

$$\hat{\sigma}_v^2 = \frac{RSS}{\text{degrees of freedom for residue}}$$

where $\sigma_v^2$ is the estimated variance of the motion data and RSS is the sum of squared differences between the measured motion data and the modeled motion data.

9. The method of claim 1 wherein the motion data are velocity data.

10. The method of claim 9 wherein the velocity data are measured with phase contrast magnetic resonance imaging.

11. The method as defined by claim 1 wherein steps c) and d) are executed iteratively.

12. The method as defined by claim 1 wherein in step c) the trajectory of a specific point within an element is related to the trajectories of the nodes of that element by:

$$\vec{x}^e(\vec{\xi}, t) = \sum_{a=1}^{n_{en}} N_a(\vec{\xi}) \vec{x}^e(\vec{\xi}_a, t)$$

where the superscript e is the index of the element, a is the index of a node point, $n_{en}$ is the number of nodes of the eth mesh element, $\vec{\xi}$ is the local coordinates of the specific point, $N_a$ is the shape function associated with the ath node, t is time, $\vec{x}^e(\vec{\xi}, t)$ is the trajectory of the specific point, and $\vec{x}^e(\vec{\xi}_a, t)$ is the trajectory of the ath node of the eth element.

13. The method as defined by claim 12 wherein in step c) the velocity of the specific point is related to the velocity of the nodes by:

$$\vec{v}^e(\vec{\xi}, t) = \sum_{a=1}^{n_{en}} N_a(\vec{\xi}) \vec{v}^e(\vec{\xi}_a, t)$$

where $\vec{v}^e(\vec{\xi}, t)$ is the velocity of the specific point, and $\vec{v}^e(\vec{\xi}_a, t)$ is the velocity of the ath node of the eth element.

14. The method as defined by claim 13 wherein in step c) the motion is modeled as being periodic with period 1/fo, and wherein the spatiotemporal finite element mesh model is:

$$\vec{v}^e(\vec{\xi}, t) = \sum_{a=1}^{n_{en}} N_a(\vec{\xi}) \sum_{k=-M, k \neq 0}^{M} (j2\pi k f_0) \vec{g}_a^e(k) e^{j2\pi k f_0 t}$$

where k is the index of a Fourier series.

15. The method as defined by claim 12 wherein in step c) the motion is modeled as being periodic with period 1/fo, and wherein step d) includes processing displacement data through displacement field modeling as follows:

$$\Delta \vec{x}^e(\vec{\xi}, t) = \sum_{a=1}^{n_{en}} N_a(\vec{\xi}) \sum_{k=-M}^{M} \vec{g}_a^e(k)(e^{j2\pi k f_0 t} - 1)$$

where $\Delta \vec{x}^e$ is the displacement of a specific point.

16. The method as defined by claim 12 wherein step d) includes calculation of a deformation gradient tensor F in each element as follows:

$$\hat{F}_{iJ}(\vec{X}, t) = \frac{\partial \hat{x}_i}{\partial X_J} = \sum_{a=1}^{n_{en}} \hat{x}_i^e(\vec{\xi}_a, t) \left( \sum_{j=1}^{n_{sd}} \frac{\partial N_a}{\partial \xi_j} \frac{\partial \xi_j}{\partial X_J} \right)$$

wherein $n_{sd}$ denotes the number of spatial dimensions.

17. The method as defined by claim 16 wherein step d) includes calculation of a Lagrangian finite strain tensor E as a function of deformation gradient as follows:

$$E = (F^T F - I)/2.$$

18. The method as defined by claim 12 wherein step d) includes calculation of a displacement field as follows:

$$\hat{\vec{x}}(\vec{X}, t) = \hat{\vec{x}}^e(\vec{\xi}, t) = \sum_{a=1}^{n_{en}} N_a(\vec{\xi}) \hat{\vec{x}}^e(\vec{\xi}_a, t).$$

19. The method of claim 1 wherein the motion data are displacement data.

20. The method of claim 19 wherein the displacement data are measured using magnetic resonance tagging.

21. The method as defined by claim 1 wherein step d) uncertainty in motion data is used to estimate uncertainty in measured kinematics of the region.

* * * * *